US012782206B2

(12) United States Patent
Aum et al.

(10) Patent No.: US 12,782,206 B2
(45) Date of Patent: Nov. 3, 2026

(54) SYSTEM FOR DIAGNOSING BUILDING ENVELOPE THERMAL PERFORMANCE BASED ON FIELD MEASUREMENT INFORMATION AND METHOD THEREOF

(71) Applicant: HIMEC (HANIL MULTIDISCIPLINARY ENGINEERING COMPANY), Seoul (KR)

(72) Inventors: Tae Yun Aum, Seoul (KR); Jin Woong Son, Seoul (KR); Jun Ho Hong, Seoul (KR)

(73) Assignee: HIMEC (Hanil Multidisciplinary Engineering Company) (KR)

( * ) Notice: Subject to any disclaimer, the term of this patent is extended or adjusted under 35 U.S.C. 154(b) by 334 days.

(21) Appl. No.: 18/398,127

(22) Filed: Dec. 27, 2023

(65) Prior Publication Data

US 2025/0198858 A1 Jun. 19, 2025

(30) Foreign Application Priority Data

Dec. 13, 2023 (KR) ........................ 10-2023-0180908

(51) Int. Cl.
*G01K 17/06* (2006.01)

(52) U.S. Cl.
CPC .................................... *G01K 17/06* (2013.01)

(58) Field of Classification Search
CPC ............................... G01K 17/06; G01K 17/20
See application file for complete search history.

(56) References Cited

U.S. PATENT DOCUMENTS 8,155,900 B1 * 4/2012 Adams .................... F24F 11/46
702/62

FOREIGN PATENT DOCUMENTS

KR 20140010579 * 7/2012 ............. G06Q 50/10
KR 20140010579 A 1/2014
KR 20210046365 * 4/2021 ............. G01N 25/18

OTHER PUBLICATIONS

Peng Xue et al., "Quantitative study on adjacent room heat transfer: Heating load and influencing factors", Sustainable Cities and Societies, 51 (2019), 8 p.*

(Continued)

*Primary Examiner* — Alexander Satanovsky
(74) *Attorney, Agent, or Firm* — Renaissance IP Law Group LLP

(57) ABSTRACT

The present inventive concept provides a system for diagnosing a building envelope thermal performance, comprising: a target zone input module for searching for a target zone including at least one outer wall in contact with the outdoor air from among spaces included and partitioned in a building and inputting information about the target zone; an adjacent zone input module for searching for an adjacent zone in contact with the target zone with an inner wall interposed therebetween and inputting information about the adjacent zone; a heating module, provided in the target zone and configured to adjust the internal temperature of the target zone in a preset manner, for uniformly heating the target zone using convection; a heat loss calculation module for calculating the amount of heat loss of the target zone in a preset manner based on a measurement load consumed by the heating module; a solar heat gain calculation module for calculating solar heat gain obtained by the target zone from solar radiation; and an infiltration load calculation module for calculating an infiltration load of the target zone using parameters measured in a preset manner, wherein the heat loss calculation module uses the solar heat gain and the infiltration load, primarily calculates the envelope load using the thermal balance between the target zone and the adjacent zone and secondarily calculates the amount of heat loss from the inner wall based on the envelope load.

8 Claims, 18 Drawing Sheets

(56) References Cited

OTHER PUBLICATIONS

Lin-Shu Wang et al., "A study of building envelop and thermal mass requirements for achieving thermal autonomy in an office building", Energy and Buildings, 78 (2014), pp. 79-88.*

* cited by examiner

FIG. 12

| Division | Initial conditions |
| --- | --- |
| Total floor area | 48 $m^2$ |
| External wall area(A) | 65 $m^2$ |
| Window area(B) | 12 $m^2$ |
| Envelope area(A+B) | 77 $m^2$ |
| Window area ratio | 0.16 |
| Window insulation performance | 0.889 W/$m^2$K |
| SHGC | 0.3 |
| Infiltration rate | 0.325 ACH |

FIG. 13

| Hour | Outdoor air temperature | Indoor temperature | Measurement load (A) | Simulator Calculation | | |
|---|---|---|---|---|---|---|
| | | | | Solar heat gain (B) | Infiltration load (C) | Envelope load (D=A-B-C) |
| 0 | 0.1 | 16 | 1338 | 0 | 261 | 1077 |
| 1 | 0.3 | 17 | 1374 | 0 | 274 | 1100 |
| 2 | -1.1 | 17 | 1421 | 0 | 297 | 1124 |
| 3 | -1.1 | 17 | 1449 | 0 | 297 | 1152 |
| 4 | -0.9 | 18 | 1486 | 0 | 310 | 1176 |
| 5 | -1.3 | 17 | 1501 | 0 | 301 | 1200 |
| 6 | -1.8 | 17 | 1533 | 0 | 309 | 1224 |
| 7 | -1.2 | 17 | 1546 | 0 | 299 | 1247 |
| 8 | 0.6 | 17 | 1341 | 42 | 269 | 1114 |
| 9 | 3.9 | 16 | 1073 | 107 | 198 | 982 |
| 10 | 9.7 | 17 | 519 | 294 | 119 | 694 |
| 11 | 11.9 | 18 | 464 | 282 | 100 | 646 |
| 12 | 12.7 | 18 | 258 | 375 | 87 | 546 |
| 13 | 8.4 | 17 | 765 | 134 | 141 | 758 |
| 14 | 9.4 | 17 | 646 | 194 | 125 | 715 |
| 15 | 8.0 | 17 | 765 | 166 | 149 | 782 |
| 16 | 5.1 | 16 | 1006 | 79 | 179 | 906 |
| 17 | 2.9 | 16 | 1211 | 0 | 215 | 996 |
| 18 | 2.5 | 17 | 1248 | 0 | 238 | 1010 |
| 19 | 2.2 | 17 | 1272 | 0 | 243 | 1029 |
| 20 | 1.7 | 17 | 1294 | 0 | 251 | 1043 |
| 21 | 0.7 | 18 | 1346 | 0 | 284 | 1062 |
| 22 | -0.5 | 18 | 1381 | 0 | 304 | 1077 |
| 23 | -1.1 | 17 | 1393 | 0 | 297 | 1096 |
| 24 | -1.4 | 18 | 1429 | 0 | 319 | 1110 |
| 25 | -1.6 | 18 | 1351 | 0 | 322 | 1029 |
| 26 | -1.6 | 17 | 1348 | 0 | 305 | 1043 |
| 27 | -2.2 | 16 | 1361 | 0 | 299 | 1062 |
| 28 | -2.5 | 16 | 1381 | 0 | 304 | 1077 |
| 29 | -2.5 | 17 | 1416 | 0 | 320 | 1096 |
| 30 | -3.2 | 17 | 1442 | 0 | 332 | 1110 |
| 31 | -3.0 | 17 | 1452 | 0 | 328 | 1124 |
| 32 | -1.5 | 17 | 1433 | 8 | 304 | 1138 |
| 33 | 1.2 | 18 | 1402 | 26 | 276 | 1152 |
| 34 | 3.5 | 18 | 1338 | 68 | 239 | 1167 |
| 35 | 4.7 | 18 | 1354 | 50 | 218 | 1186 |
| 36 | 8.2 | 19 | 1235 | 143 | 178 | 1200 |
| 37 | 8.1 | 18 | 1260 | 117 | 163 | 1214 |
| 38 | 7.4 | 18 | 1269 | 90 | 174 | 1185 |
| 39 | 5.0 | 17 | 1314 | 32 | 197 | 1149 |
| 40 | 4.0 | 17 | 1254 | 24 | 213 | 1065 |
| 41 | 2.7 | 17 | 1287 | 0 | 235 | 1077 |
| 42 | 2.6 | 17 | 1162 | 0 | 236 | 926 |
| 43 | 2.1 | 17 | 1184 | 0 | 245 | 939 |
| 44 | 1.3 | 17 | 1225 | 0 | 258 | 967 |
| 45 | 0.8 | 16 | 1302 | 0 | 250 | 1052 |
| 46 | 0.3 | 16 | 1333 | 0 | 258 | 1075 |
| 47 | 0.0 | 17 | 1398 | 0 | 279 | 1119 |

FIG. 14

| | | | | | | | | | | | | | | | | | | | | | | | |
|---|---|---|---|---|---|---|---|---|---|---|---|---|---|---|---|---|---|---|---|---|---|---|---|
| -0.3 | 0.0 | 0.2 | -0.1 | 0.0 | 0.2 | -0.3 | 0.1 | 0.0 | -0.1 | 0.2 | -0.2 | 0.3 | -0.3 | -0.1 | 0.2 | -0.3 | 0.6 | -0.2 | -0.2 | 0.1 | -0.5 | 0.6 | 0.1 |
| 0.0 | -0.2 | -0.1 | 0.2 | 0.0 | 0.0 | 0.2 | -0.3 | 0.1 | 0.0 | -0.2 | 0.4 | -0.3 | 0.3 | -0.3 | -0.2 | 0.3 | -0.4 | 0.6 | -0.2 | -0.2 | 0.1 | -0.5 | 0.7 |
| 0.2 | -0.1 | -0.1 | 0.1 | 0.0 | 0.0 | 0.1 | -0.1 | 0.0 | -0.1 | 0.1 | -0.1 | -0.1 | 0.1 | 0.0 | 0.1 | 0.0 | -0.3 | 0.1 | 0.1 | 0.0 | 0.2 | -0.2 | -0.1 |
| -0.1 | 0.2 | 0.1 | -0.2 | 0.1 | 0.0 | -0.1 | 0.2 | -0.2 | 0.2 | -0.1 | -0.2 | 0.2 | -0.3 | 0.4 | -0.1 | -0.1 | 0.3 | -0.5 | 0.2 | 0.0 | 0.1 | 0.4 | -0.5 |
| 0.0 | 0.0 | 0.0 | 0.1 | -0.1 | 0.0 | 0.1 | -0.2 | 0.2 | -0.1 | 0.0 | 0.1 | -0.2 | 0.3 | -0.3 | 0.0 | 0.1 | -0.1 | 0.2 | -0.2 | 0.2 | 0.0 | -0.2 | 0.2 |
| 0.2 | 0.0 | 0.0 | 0.0 | 0.0 | 0.0 | -0.1 | 0.2 | -0.1 | 0.0 | 0.0 | -0.1 | 0.2 | -0.1 | 0.1 | 0.0 | 0.1 | -0.1 | -0.2 | 0.4 | -0.1 | 0.1 | -0.2 | -0.1 |
| -0.3 | 0.2 | 0.1 | -0.1 | 0.1 | -0.1 | -0.1 | 0.1 | -0.1 | 0.0 | 0.1 | 0.0 | 0.2 | -0.4 | 0.1 | 0.1 | -0.3 | 0.5 | -0.2 | -0.2 | 0.0 | -0.3 | 0.8 | -0.3 |
| 0.1 | -0.3 | -0.1 | 0.2 | -0.2 | 0.2 | 0.1 | -0.3 | 0.2 | -0.1 | 0.0 | 0.2 | -0.3 | 0.4 | -0.4 | 0.0 | 0.1 | -0.3 | 0.6 | -0.4 | 0.0 | 0.2 | -0.7 | 0.7 |
| 0.0 | 0.1 | 0.0 | -0.2 | 0.2 | -0.1 | -0.1 | 0.2 | -0.1 | 0.1 | 0.1 | -0.2 | 0.2 | -0.3 | 0.2 | -0.1 | 0.1 | 0.1 | -0.5 | 0.3 | 0.0 | -0.1 | 0.3 | -0.3 |
| -0.1 | 0.0 | -0.1 | 0.2 | -0.1 | 0.0 | 0.0 | -0.1 | 0.1 | 0.0 | -0.1 | 0.1 | -0.1 | 0.1 | -0.2 | 0.2 | -0.1 | -0.2 | 0.2 | -0.2 | 0.0 | 0.0 | 0.0 | 0.1 |
| 0.2 | -0.2 | 0.1 | -0.1 | 0.0 | 0.0 | 0.1 | 0.0 | 0.1 | -0.1 | 0.0 | 0.0 | -0.1 | 0.1 | 0.2 | -0.1 | 0.0 | -0.2 | 0.1 | 0.1 | 0.0 | 0.2 | -0.4 | 0.1 |
| -0.2 | 0.4 | -0.1 | -0.2 | 0.1 | -0.1 | 0.0 | 0.2 | -0.2 | 0.1 | 0.0 | -0.2 | 0.1 | -0.1 | 0.2 | -0.1 | 0.0 | 0.2 | -0.5 | 0.3 | 0.0 | 0.0 | 0.4 | -0.5 |
| 0.3 | -0.3 | -0.1 | 0.2 | -0.2 | 0.2 | 0.2 | -0.3 | 0.2 | -0.1 | -0.1 | 0.1 | 0.0 | 0.3 | -0.4 | 0.2 | -0.1 | -0.3 | 0.6 | -0.3 | 0.2 | 0.0 | -0.5 | 0.4 |
| -0.3 | 0.3 | 0.1 | -0.3 | 0.3 | -0.1 | -0.4 | 0.4 | -0.3 | 0.1 | 0.1 | -0.1 | 0.3 | -0.8 | 0.6 | -0.3 | 0.0 | 0.8 | -1.0 | 0.5 | -0.3 | 0.0 | 0.8 | -0.6 |
| -0.1 | -0.3 | 0.0 | 0.4 | -0.3 | 0.1 | 0.1 | -0.4 | 0.2 | -0.2 | 0.2 | 0.2 | -0.4 | 0.6 | -0.9 | 0.4 | 0.0 | -0.3 | 1.0 | -1.0 | 0.4 | -0.4 | -0.3 | 0.8 |
| 0.2 | -0.2 | 0.1 | -0.1 | 0.0 | 0.0 | 0.1 | 0.0 | -0.1 | 0.2 | -0.1 | -0.1 | 0.2 | -0.3 | 0.4 | -0.2 | 0.1 | 0.0 | -0.4 | 0.7 | -0.4 | 0.3 | -0.4 | 0.1 |
| -0.3 | 0.3 | 0.0 | -0.1 | 0.1 | 0.1 | -0.3 | 0.1 | 0.1 | -0.1 | 0.0 | 0.0 | -0.1 | 0.0 | 0.0 | 0.1 | -0.1 | 0.1 | 0.1 | -0.4 | 0.2 | -0.4 | 0.8 | -0.3 |
| 0.6 | -0.4 | -0.3 | 0.3 | -0.1 | -0.1 | 0.5 | -0.3 | 0.1 | -0.2 | -0.2 | 0.2 | -0.3 | 0.8 | -0.3 | 0.0 | 0.1 | -0.8 | 0.7 | 0.1 | -0.2 | 0.8 | -1.5 | 0.7 |
| -0.2 | 0.6 | 0.1 | -0.5 | 0.2 | -0.2 | -0.2 | 0.6 | -0.5 | 0.2 | 0.1 | -0.5 | 0.6 | -1.0 | 1.0 | -0.4 | 0.1 | 0.7 | -1.5 | 0.6 | 0.1 | -0.2 | 1.3 | -1.4 |
| -0.2 | -0.2 | 0.1 | 0.2 | -0.2 | 0.4 | -0.2 | -0.4 | 0.3 | -0.2 | 0.1 | 0.3 | -0.3 | 0.5 | -1.0 | 0.7 | -0.4 | 0.1 | 0.6 | -0.8 | 0.3 | -0.3 | -0.1 | 0.6 |
| 0.1 | -0.2 | 0.0 | 0.0 | 0.2 | -0.1 | 0.0 | 0.0 | 0.0 | 0.0 | 0.0 | 0.0 | 0.2 | -0.3 | 0.4 | -0.4 | 0.2 | -0.2 | 0.1 | 0.3 | -0.2 | 0.0 | -0.5 | 0.5 |
| -0.5 | 0.1 | 0.2 | 0.1 | 0.0 | 0.1 | -0.3 | 0.2 | -0.1 | 0.0 | 0.2 | 0.0 | 0.0 | 0.0 | -0.4 | 0.3 | -0.4 | 0.8 | -0.2 | -0.3 | 0.0 | -0.8 | 1.3 | -0.2 |
| 0.6 | -0.5 | -0.2 | 0.4 | -0.2 | -0.2 | 0.8 | -0.7 | 0.3 | 0.0 | -0.4 | 0.4 | -0.5 | 0.8 | -0.3 | -0.4 | 0.8 | -1.5 | 1.3 | -0.1 | -0.5 | 1.3 | -2.1 | 1.0 |
| 0.1 | 0.7 | -0.1 | -0.5 | 0.2 | -0.1 | -0.3 | 0.7 | -0.3 | 0.1 | 0.1 | -0.5 | 0.4 | -0.6 | 0.8 | 0.1 | -0.3 | 0.7 | -1.4 | 0.6 | 0.5 | -0.2 | 1.0 | -1.5 |

FIG. 15

| | | | | | | | | | | | | | | | | | | | | | | | |
|---|---|---|---|---|---|---|---|---|---|---|---|---|---|---|---|---|---|---|---|---|---|---|---|
| 17.0 | 15.7 | 15.9 | 16.2 | 16.5 | 16.7 | 17.0 | 17.2 | 17.4 | 17.6 | 17.8 | 18.1 | 18.3 | 18.6 | 18.1 | 17.6 | 16.5 | 16.3 | 14.2 | 14.3 | 14.8 | 16.1 | 16.4 | 17.1 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |

| | | | | | | | | | | | | | | | | | | | | | | | |
|---|---|---|---|---|---|---|---|---|---|---|---|---|---|---|---|---|---|---|---|---|---|---|---|
| 0.3384 | -0.532 | -0.08 | 0.4085 | -0.18 | 0.0436 | 0.2646 | -0.126 | 0.2393 | -0.163 | 0.0365 | 0.0357 | -0.269 | 0.6939 | -0.631 | 0.4178 | -0.29 | 0.1142 | 0.7395 | -0.009 | -0.183 | 0.3127 | -0.993 | 0.8847 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 16

FIG. 19

| Division | Initial conditions |
|---|---|
| Outdoor air temperature | -3 ℃ |
| Indoor temperature | 22 ℃ |
| Temperature of adjacent zone | 17 ℃ |
| Measurement load | 2500 W |
| Integrated thermal transmittance of the envelope(K1) | 0.93 W/$m^2$K |

⇨

| Division | Initial conditions |
|---|---|
| The amount of heat loss of the envelope | 1790 W |
| Solar heat gain | 290 W |
| Infiltration load | 412 W |
| Measurement load | 2500 W |
| the amount of the inner wall heat loss | ***588 W*** |

SYSTEM FOR DIAGNOSING BUILDING ENVELOPE THERMAL PERFORMANCE BASED ON FIELD MEASUREMENT INFORMATION AND METHOD THEREOF

TECHNICAL FIELD

The present inventive concept relates to a system for diagnosing a building envelope thermal performance based on field measurement information and a method of diagnosing the same.

BACKGROUND OF THE INVENTIVE CONCEPT

One of the main factors that affect energy consumption of buildings is a building envelope, and heat loss from the building envelope is generally 15 to 30%. Because the lifespan of the building is at least 30 years, a high energy performance plan at the time of initial design of the building is effective in reducing the country's future energy consumption and greenhouse gases.

Accordingly, it can be said that energy performance evaluation of existing buildings with low energy efficiency is essential, and there is growing interest in methods of measuring the field thermal performance of the entire building or its components to calculate the thermal performance and energy efficiency of the actual building.

The energy consumption of a building is determined largely depending on the load characteristics inside the building and the efficiency of the facility system. At this time, the load includes the heating characteristics the building's interior, usage characteristics and the thermal performance of the building's exterior. Here, the building 'envelope thermal performance' includes the insulation performance, airtightness performance, and window glass performance of the solid part of the building envelope, including walls and window frames, and these are mostly measured directly in the field.

Because the 'building energy efficiency rating', 'zero energy building certification' and the like which are the main certification standards indicating the energy performance of this building calculate the primary energy consumption per unit zone used in the evaluation using envelope information based on theoretical calculations at the initial design stage, it is difficult to reflect the characteristics of the building in the field and therefore, the envelope thermal performance must be measured in the field.

However, the heat flow meter (HFM) technique used to measure the thermal performance of existing outer walls can be used effectively only in winter when the $\Delta T$ temperature difference is more than 10° C., and in old buildings, it difficult to meet the test standards presented in ISO 9869-1 (HFM method) as well as it is also difficult to measure the energy performance of HVAC (especially, refrigerant heat sources) in old buildings. Furthermore, there are limitations in defining the amount of load according to user characteristics in operating conditions, and in particular, it is difficult (for reasons such as time delay) to determine the influence of internal thermal storage materials such as furniture placed inside the outer wall.

Therefore, there is a need to develop technology that can address the above-mentioned problems.

SUMMARY OF THE INVENTIVE CONCEPT

The present inventive concept is intended to solve the above-described conventional problems, and would like to propose a technology that can overcome the temporal and practical limitations of existing methods of measuring the thermal performance of a building envelope and that can derive the approximate value of indicator for evaluating envelope thermal performance in the field in a simple manner.

The technical problems to be achieved by the present inventive concept is not limited to the technical problems mentioned above, and other technical problems not mentioned will be clearly understood by those skilled in the art from the description below.

The present inventive concept relates to a system for diagnosing a building envelope thermal performance, comprising a target zone input module for searching for a target zone including at least one outer wall in contact with the outdoor air from among spaces included and partitioned in a building and inputting information about the target zone; an adjacent zone input module for searching for an adjacent zone in contact with the target zone with an inner wall interposed therebetween and inputting information about the adjacent zone; a heating module, provided in the target zone and configured to adjust the internal temperature of the target zone in a preset manner, for uniformly heating the target zone using convection; a heat loss calculation module for calculating the amount of heat loss of the target zone in a preset manner based on a measurement load consumed by the heating module; a solar heat gain calculation module for calculating solar heat gain obtained by the target zone from solar radiation; and an infiltration load calculation module for calculating an infiltration load of the target zone using parameters measured in a preset manner, wherein the heat loss calculation module uses the solar heat gain and the infiltration load, primarily calculates the envelope load using the thermal balance between the target zone and the adjacent zone and secondarily calculates the amount of heat loss from the inner wall based on the envelope load.

In addition, the heat loss calculation module includes an envelope load calculation unit for calculating an envelope load that is heat-lost to the outdoor through the outer wall of the target zone; and an inner wall heat loss calculation unit for calculating an inner wall heat loss that is heat-lost to the adjacent zone through the inner wall of the target zone, wherein the envelope load calculation unit may control the heating module in real time so that the indoor temperature of the target zone becomes the same as the indoor temperature of the adjacent zone, and calculate the envelope load using an outdoor air temperature sensed at a preset period.

In addition, the inner wall heat loss calculation unit may control the heating module in real time so that the indoor temperature of the target zone has a preset difference value from the indoor temperature of the adjacent zone, and calculate the inner wall heat loss using the outdoor air temperature and the envelope load.

Additionally, the heating module may be configured to adjust the indoor temperature of the target zone in real time so that the changing indoor temperature of the adjacent zone becomes the same as the indoor temperature of the target zone.

In addition, when the target zone is arranged to be adjacent to a plurality of adjacent zones, the envelope load calculation unit may calculate the adjacent ratio of each of the target zone and the adjacent zone and determine a representative indoor temperature of the adjacent zone under the consideration of the adjacent ratio to the indoor temperature of each adjacent zone.

In addition, the heating module includes a main heating module provided in the target zone; and a sub-heating module provided in the adjacent zone, wherein when the target zone is arranged to be adjacent to a plurality of adjacent zones, the sub-heating module provided in each of the plurality of adjacent zones may be controlled to artificially adjust the indoor temperatures in all of the plurality of adjacent zones to be the same.

In addition, the present inventive concept relates to a method of diagnosing a building envelope thermal performance using the above-described system, comprising: a step (a1) in which information about the target zone is inputted to the target zone input module, and the adjacent zone which is in contact to the target zone with an inner wall interposed therebetween is searched for and inputted to the adjacent zone input module; a step (a2) in which the infiltration load calculation module calculates the infiltration load of the target zone using parameters measured in a preset manner, and the solar radiation heat gain calculation module calculates the solar radiation heat gain obtained by the target zone from solar radiation; a step (a3) in which the envelope load calculation unit controls the heating module in real time so that the indoor temperature of the target zone becomes the same as the indoor temperature of the adjacent zone in which the envelope load calculation unit calculates the envelope load using the outdoor air temperature sensed at a preset period, but by further considering the measurement load, infiltration load and solar heat gain of the heating module for a reference time; and a step(a4) in which the inner wall heat loss calculation unit controls the heating module in real time so that the indoor temperature of the target zone has a preset difference value from the indoor temperature of the adjacent zone, and uses the outdoor air temperature and the envelope load to calculate the amount of heat loss from the inner wall for the reference time.

In addition, in step (a3), the envelope load calculation unit may control the heating module so that the indoor temperature and humidity of the adjacent zone that change in real time become the same as the indoor temperature and humidity of the target zone by using a temperature and humidity sensor provided in the adjacent zone.

The present inventive concept can overcome the temporal and practical limitations of existing methods of measuring the envelope thermal performance of buildings, and can derive approximate values of indicators for evaluating the envelope thermal performance in the field in a simple way.

In addition, the present inventive concept is a simple method capable of complementing the advantages and disadvantages of the envelope thermal performance distribution analysis by the currently wide-used thermal imaging measurement method and the conduction characteristic analysis by the heat flow method and of evaluating the thermal performance of the envelope while the target zone has internal furniture, obstacles (noise) and attachments included therein.

The effects of the present inventive concept are not limited to those described above and should be understood to include all effects that may be inferred from the configuration of the inventive concept described in the detailed description or claims of the present inventive concept.

BRIEF DESCRIPTION OF THE DRAWINGS

The above and other aspects, features and benefits of specific preferred embodiments of the present inventive concept will become more apparent from the following description with reference to the accompanying drawings.

FIG. 12 is a table showing exemplary initial condition of a target zone to explain a method of evaluating thermal performance of a building wall according to an embodiment of the present inventive concept.

FIG. 13 is a table showing exemplary test data measured for 48 hours to explain steps S240 and S250 of FIG. 9.

FIG. 14 shows the inverse matrix of the inner and outer temperature difference matrix ([T]) of the target zone, based on the exemplary test data of FIG. 13.

FIG. 15 is a matrix showing $[q_{facade}]/A$ based on the exemplary test data of FIG. 13.

FIG. 16 is a matrix showing K1·[D] based on the exemplary test data of FIG. 13.

FIG. 19 is a table showing the result of calculating the amount of heat loss of the inner wall, with the indoor temperature of the exemplary target zone maintained at 22° C. based on the exemplary test data of FIG. 13.

DETAILED DESCRIPTION OF THE INVENTIVE CONCEPT

Figure 1:
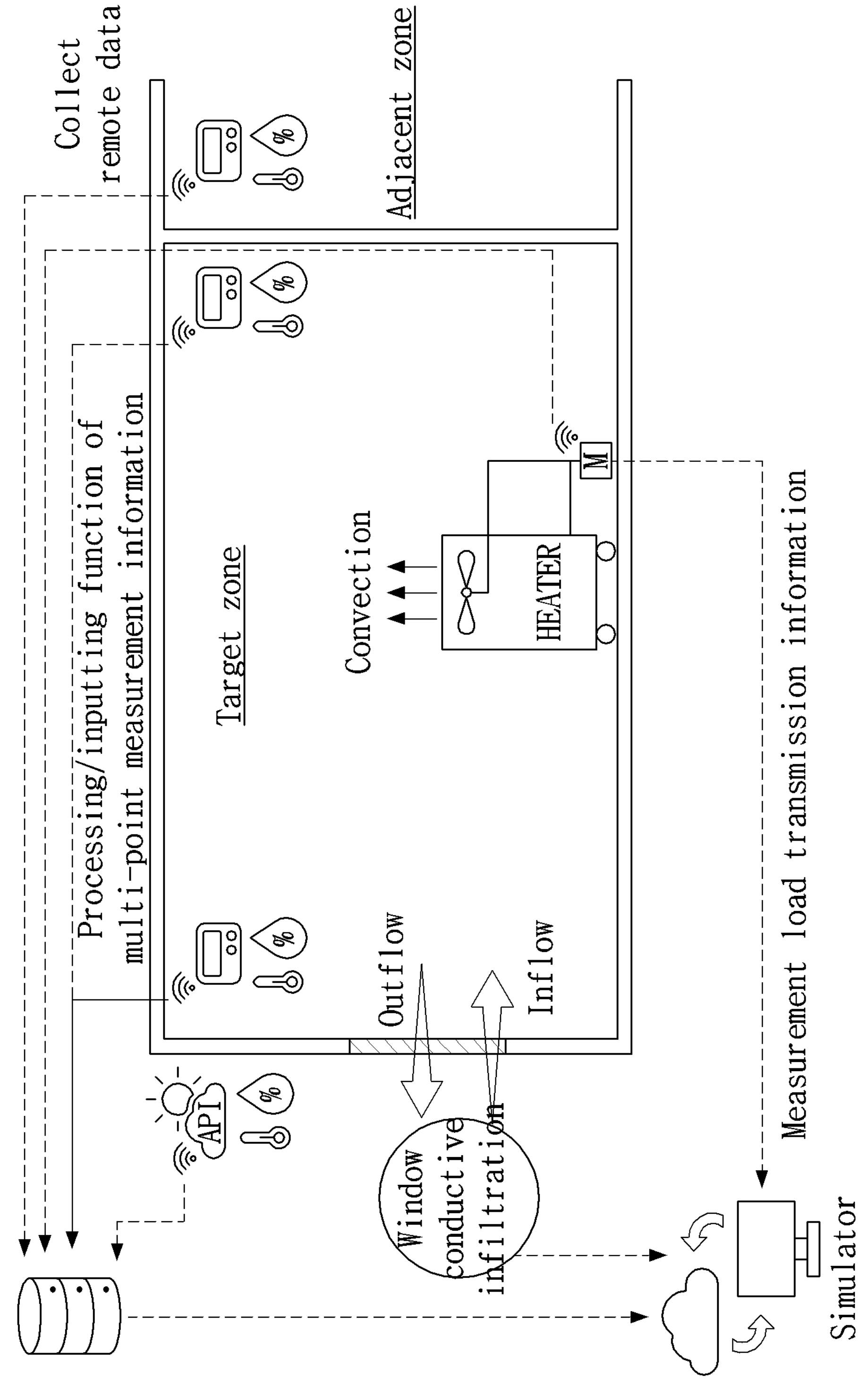
FIG. 1 is a conceptual diagram of a system according to an embodiment of the present inventive concept.

The present inventive concept can make various changes and have various embodiments, and specific embodiments will be illustrated in the drawings and described in detail in the detailed description. However, this is not intended to limit the present inventive concept to specific embodiments, and should be understood to include all changes, equivalents, and substitutes included in the spirit and technical scope of the present inventive concept. In respective drawings, similar reference numerals are used for similar components.

Terms such as first, second, A, B, etc. may be used to describe various components, but the components should not be limited by the terms. The terms are used only to distinguish one component from another component. For example, a first component may be named a second component, and similarly, the second component may also be named a first component without departing from the scope of the present inventive concept. The term "and/or" includes any one of a plurality of relevant items or a combination thereof.

When a component is said to be "connected" or "coupled" to the other component, it is understood that a component may be directly connected to or connected to the other component, but that another component may exist therebetween. Whilst, when it is mentioned that a component is "directly connected" or "directly coupled" to the other component, it should be understood that there are no another component therebetween.

The terms used in this application are only used to describe specific embodiments and are not intended to limit the present inventive concept. Singular expressions include plural expressions unless the context clearly indicates otherwise. It should be understood that in this application, terms such as "include" or "have" are intended to designate the presence of feature, number, step, operation, component, part or the combination thereof described in the specification, but are not intended to exclude in advance the possibility of the presence or addition of one or more other features, numbers, steps, operations, components, parts or the combination thereof.

Unless otherwise defined, all terms used herein, including technical or scientific terms, have the same meaning as generally understood by a person of ordinary skill in the technical field to which the present inventive concept pertains. Terms as defined in generally used dictionaries should be interpreted as having a meaning consistent with the meaning in the context of the related technology, and unless explicitly defined in the present application, they should not be interpreted in an ideal or excessively formal sense.

Hereinafter, the building envelope thermal performance diagnosis system according to the present inventive concept will be described with reference to the drawings.

FIG. 1 is a conceptual diagram of a system according to an embodiment of the present inventive concept.

Referring to FIG. 1, the system according to an embodiment of the present inventive concept divides and processes the 'target zone' that is the target of thermal performance measurement and the 'adjacent zone' that is adjacent to the target zone.

The target zone can be understood as an indoor space including the envelope (or outer wall). The envelope is the surface that comes into contact with the outdoor air and may include an outer wall or windows (including window frames). A heating module may be provided inside the target zone, and the heating module may include a heater and a driving means (for example, a motor). The number of heaters and outputs thereof can be optimally provided depending on the condition of the target zone.

In FIG. 1, separate internal configurations in the target zone and adjacent zones are omitted, but in reality, furniture, etc. may be placed inside them in a specific shape, and the actual structure of the target zone is not such rectangular plane as shown, but may be can be designed to have the shape of different plane. The present inventive concept is a system that diagnoses the thermal performance of the envelope based on the current state of the target zone, the system may provide a user with the results of the intuitive evaluation of the thermal performance of the wall in the current state by diagnosing the thermal performance in the state including the current internal furniture and attachments.

Temperature and humidity sensors that sense temperature and humidity are installed inside the target zone, and inside and outdoor the adjacent zones, and the temperature and humidity information obtained from these are collected and calculated by an integrated server.

Figure 2:
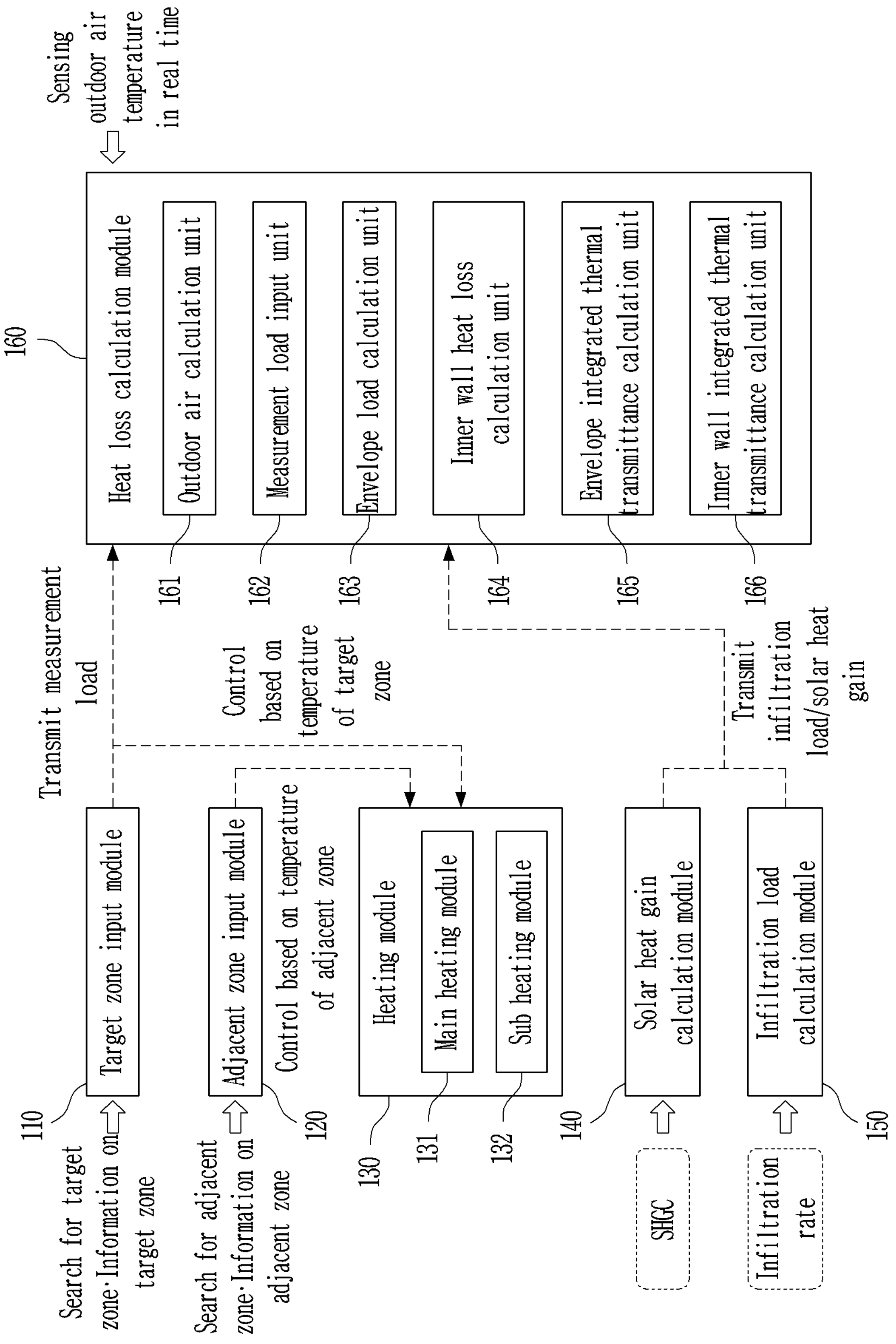
FIG. 2 is a block diagram showing the configuration of a system according to an embodiment of the present inventive concept.

FIG. 2 is a block diagram showing the configuration of a system according to an embodiment of the present inventive concept.

The description will be made with reference to FIG. 2 along with FIG. 1 described above. The building envelope thermal performance diagnosis system of the present inventive concept may include a target zone input module 110, an adjacent zone input module 120, a heating module 130, a solar heat gain calculation module 140, an infiltration load calculation module 150 and a heat loss calculation module 160.

The target zone input module 110 searches for the target zones and provides them to the user, and when multiple target zones are searched, the user can select a target zone. Information about individual target zone is input, and as an example, target zone shape information, window information, etc. may all be inputted. Of course, the user may be set to directly select the target zone.

Figure 3:
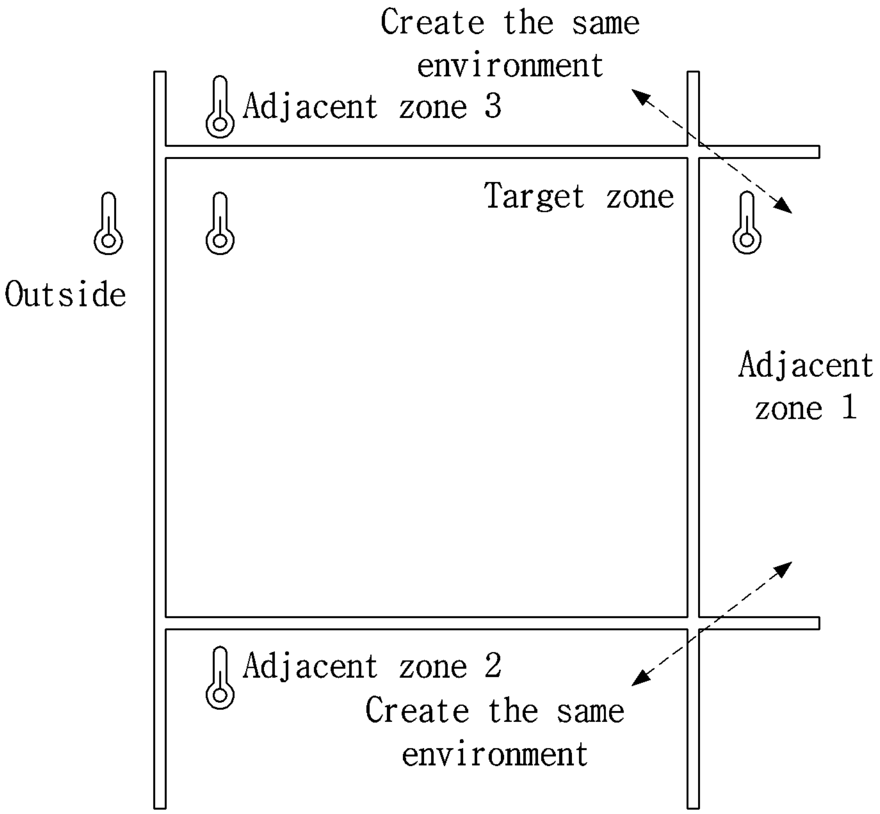
FIG. 3 is a schematic diagram showing the target zone and adjacent zones of the system according to an embodiment of the present inventive concept.

FIG. 3 is a schematic diagram showing the target zone and adjacent zones of the system according to an embodiment of the present inventive concept. Referring to FIG. 3, it can be seen that the target zone and the adjacent zones are distinguished.

In the present application, the explanation is made on the premise that heat loss does not occur through the ceiling, roof, floor, etc. of the target zone, but that heat loss occurs through the outer or inner walls. However, it is specified in advance that the idea and principle disclosed in the present application may be applied three-dimensionally to the target zone.

The adjacent zone input module 120 is configured to search for the adjacent zone which is in contact to the target zone with an inner wall interposed therebetween (or it is a concept that includes both selection and direct input methods by the user), and information about this adjacent zone can be inputted. Information on the shape and volume of the adjacent zone, the zone and thickness of the inner wall, etc. can all be inputted to the adjacent zone input module 120. At this time, any known means can be used to input information about the adjacent zone.

The heating module 130 includes a heater and a driving means. The heating module 130 heats the target zone by a convection scheme, and may be provided with a fan that forcibly circulates the heated air. The heating module 130 can be divided into a main heating module 131 provided in the target zone and a sub heating module 132 provided in the adjacent zone.

Although the adjacent zone is an internal space, it can be partially differentiated from the target zone in that the adjacent zone is not forcibly heated. However, when there are multiple adjacent zones, the sub-heating module 132 may be used as an auxiliary means to maintain uniform temperatures between the adjacent zones. This is because when the target zone is in contact with a plurality of adjacent zones, the status information (temperature, humidity, etc.) of each adjacent zone may not be the same. The sub-heating module 132 can be used to correct errors between these adjacent zones.

The solar heat gain calculation module 140 is configured to calculate the amount of solar heat gain. The solar heat transmission through windows is calculated using the solar heat gain coefficient (SHGC). The SHGC includes both transmitted shortwave radiation and longwave radiation in which the amount of solar radiation absorbed by windows is transferred to the inner zone, and in the thermal balance method, longwave radiation from windows can be added to the conductive component. The amount of solar heat gain through windows can be composed of the amount of longwave radiation inside the room of the amount of solar radiation transmitted through windows and the amount of solar radiation absorbed by the window system, and the solar radiation transmitted through windows is directly transferred to the inside surface of the room and can be reflected into the inside surface thermal balance. The SHGC can be calculated in a known manner.

The infiltration load calculation module 150 is configured to calculate the infiltration load of the target zone using preset parameters. In other words, the infiltration load can be understood as the airtightness performance of the target zone, and the infiltration load calculation module 150 can calculate the infiltration rate based on values measured in the field.

The infiltration load can be calculated by an equation based on the indoor temperature, outdoor air temperature, specific heat and the amount of infiltration. If the indoor temperature and outdoor air temperature are monitored and the amount of infiltration is defined by airtightness performance measurement, the infiltration load can be calculated using them.

The heat loss calculation module 160 may include an outdoor air temperature input unit 161, a measurement load input unit 162, an envelope load calculation unit 163, an inner wall heat loss calculation unit 164, an envelope integrated thermal transmittance calculation unit 165, and an inner wall integrated thermal transmittance calculation unit 166.

The outdoor air temperature input unit 161 is configured to automatically sense the outdoor air temperature and input it in real time. Information about the outdoor air temperature can be used in various ways in the process of calculating the load. In addition, the outdoor air temperature inputted to the outdoor air temperature input unit 161 can utilize public data (all including various Open-APIs) from the Meteorological Administration as needed.

The measurement load input unit 162 is connected to the heating module 130 and is configured to receive information about the amount of energy usage therefrom. The amount of energy usage during a preset unit time (e.g., one hour) can be calculated and used when calculating the load.

Figure 4:
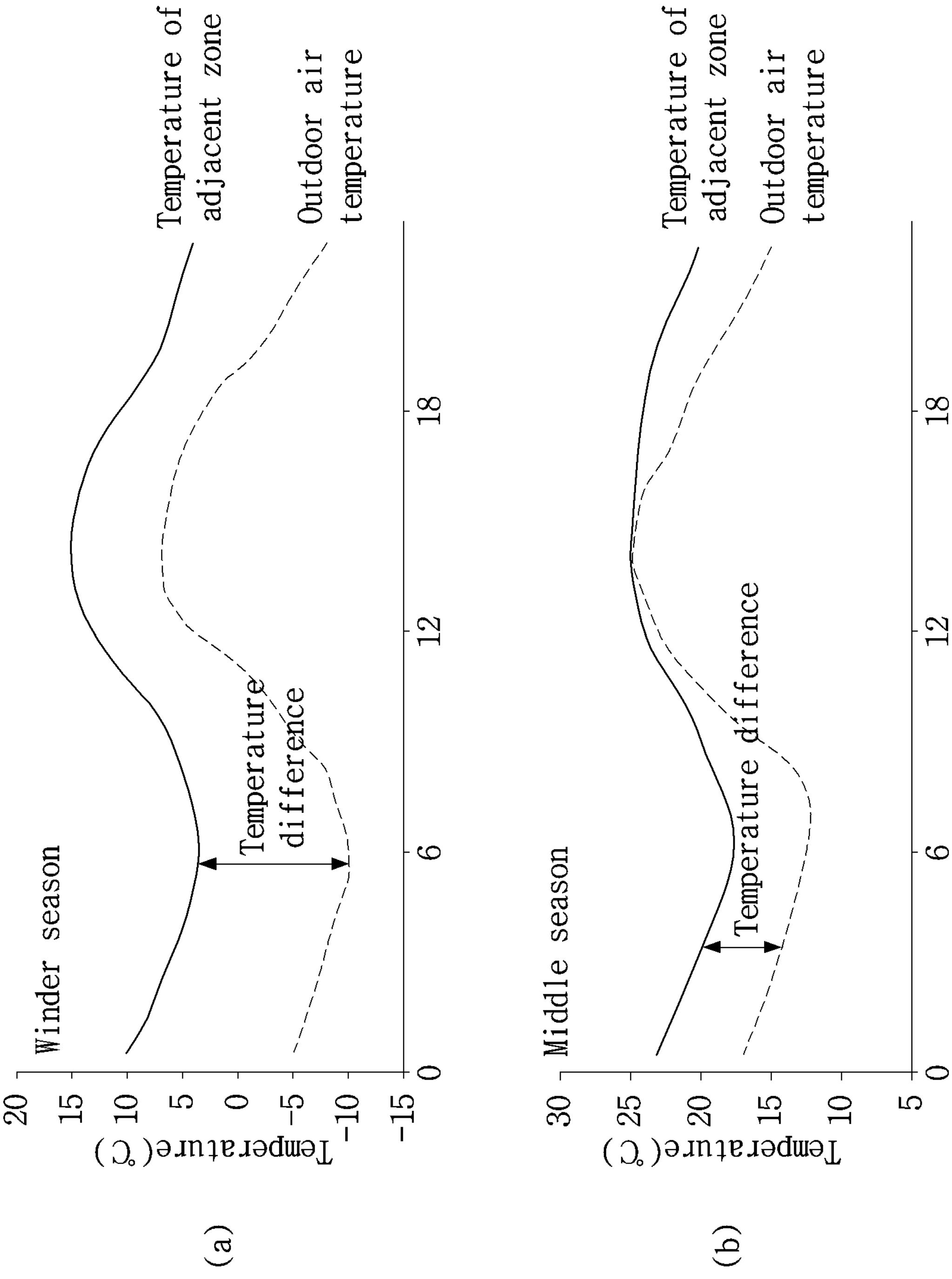
FIG. 4(*a*) shows the temperatures of the adjacent zone and the outdoor air in the winter season, and FIG. 4(*b*) is a graph showing the temperatures of the adjacent zone and the outdoor air in the middle season.
Figure 5:
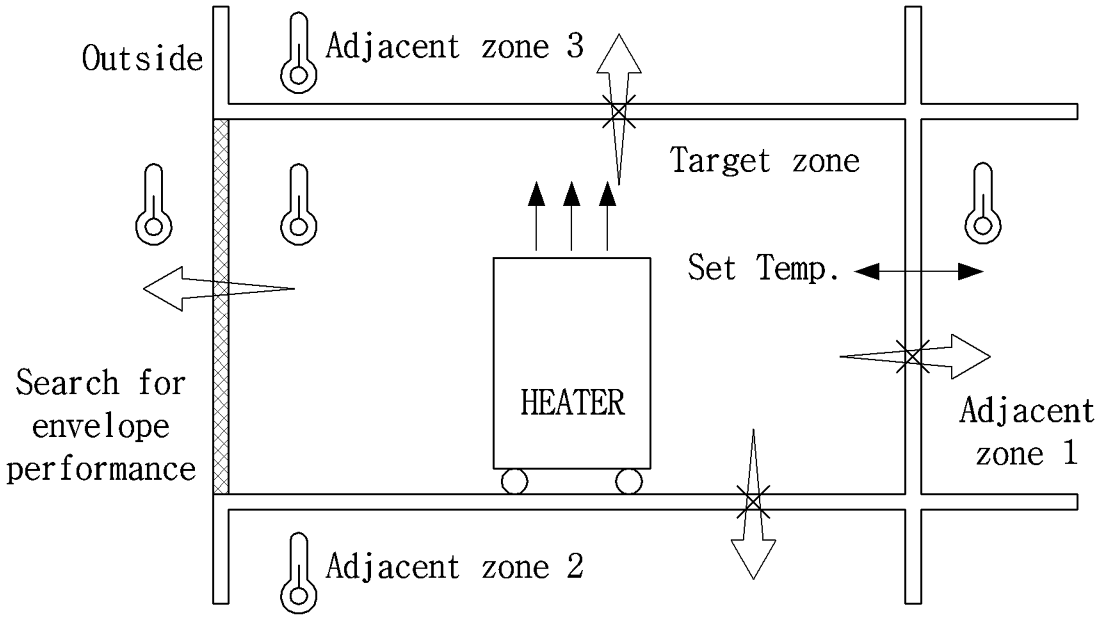
FIG. 5 is a schematic diagram showing processing of the envelope load calculation unit of the system according to an embodiment of the present inventive concept.

The envelope load calculation unit 163 is configured to calculate the envelope load that is heat-lost to the outdoor through the outer wall of the target zone. The process of calculating the envelope load will be described with reference to FIGS. 4 and 5. FIG. 4(*a*) shows the temperature of the adjacent zone and the outdoor air temperature in the winter season, and FIG. 4(*b*) is a graph showing the temperature of the adjacent zone and the outdoor air temperature in the middle season. FIG. 5 is a schematic diagram showing the processing of the envelope load calculation unit in the system according to an embodiment of the present inventive concept.

As shown in FIG. 4, the outdoor air temperature changes continuously on a 24-hour basis and unlike the target zone where the heating module is operated, the indoor temperature of the adjacent zone is also configured to change continuously. The temperature difference in the winter season can be formed relatively larger than the temperature difference in the middle season.

When explained with reference to FIG. 5, the envelope load means calculating the amount of heat loss to the outdoor through the envelope of the target zone. That is, in order to exclude the amount of conduction heat loss through the inner wall, the indoor temperature of the target zone and the temperature of adjacent zone are artificially made the same using a heating module. In FIG. 5, the adjacent zones are divided into adjacent zones 1 to 3, but the test conditions define that their indoor temperatures are all the same.

To this end, before operating the heating module, all conditions can be initialized through a 'purge step'. This is because if the purge step is not performed, there may be residual heat energy inside the target zone. The purge step, which sets the initial test conditions, means opening the target zone so that the outside air can enter and exit freely. In the purge step, the indoor temperature of the target zone falls close to the outdoor air temperature. Additionally, the adjacent zones can be set so that they are distributed under similar temperature conditions by opening the internal space thereof.

The envelope load can be calculated using the thermal balance between the target zone and the adjacent zones. For convenience of explanation, this is referred to as 'step 1'.

By making the indoor temperatures of the target zone and adjacent zones the same, the amount of conductive heat loss through the inner wall can be eliminated. In other words, the amount of energy usage by the heating module can be regarded as the envelope load. Regarding the point of time to calculate the amount of energy usage, when the heating module is operated, the temperature of the target zone continues to rise, and when the indoor temperature of the target zone first becomes the same point of time as the indoor temperature of the adjacent zone, the amount of energy usage can be calculated at that point. In other words, the amount of energy consumed from that point onwards can be determined to be the envelope load.

As an example, the envelope load calculation unit 163 is configured to receive real-time information on the indoor temperature of the target zone and the indoor temperature of the adjacent zones and to receive the accumulated amount of energy usage of the heating module 130 from the point of time when these temperatures become the same for the first time.

Figure 6:
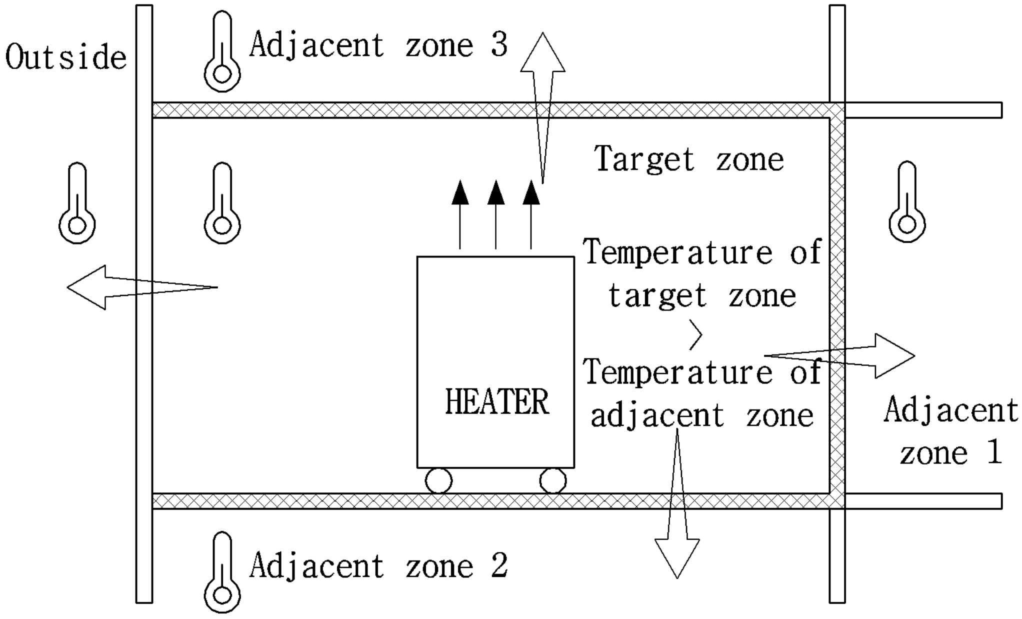
FIG. 6 is a schematic diagram showing processing of the inner wall heat loss calculation unit of the system according to an embodiment of the present inventive concept.

FIG. 6 is a schematic diagram showing the processing of the inner wall heat loss calculation unit in the system according to an embodiment of the present inventive concept. The process of calculating the amount of inner wall heat loss which is heat-lost through the inner wall of the target zone to the adjacent zone will be described with reference to FIG. 6.

As described above, the amount of inner wall heat loss can be calculated using the envelope load calculated by the envelope load calculation unit 163.

As shown in FIG. 6, the heating module can be controlled so that the indoor temperature of the target zone has a preset difference value (e.g., 10° C.) from the indoor temperature of the adjacent zone. In this case, because the envelope load is already known, the inner wall heat loss can be calculated by applying the known envelope load again. If there are multiple adjacent zones, it can be understood that the summed amount of heat loss of all of them becomes the amount of integrated heat loss.

Meanwhile, when there are multiple adjacent zones, if the process of the above-mentioned step 1 is repeated for the number of adjacent zones, the amount of heat loss from the inner wall conducted to each of the multiple adjacent zones can be calculated.

As another modified example, when the target zone is arranged to be adjacent to a plurality of adjacent zones, the adjacency ratio of each of target zone and the adjacent zones is calculated, and then the representative indoor temperature of the adjacent zone can be determined by taking the indoor temperature of each of the adjacent zones into consideration.

Figure 7:
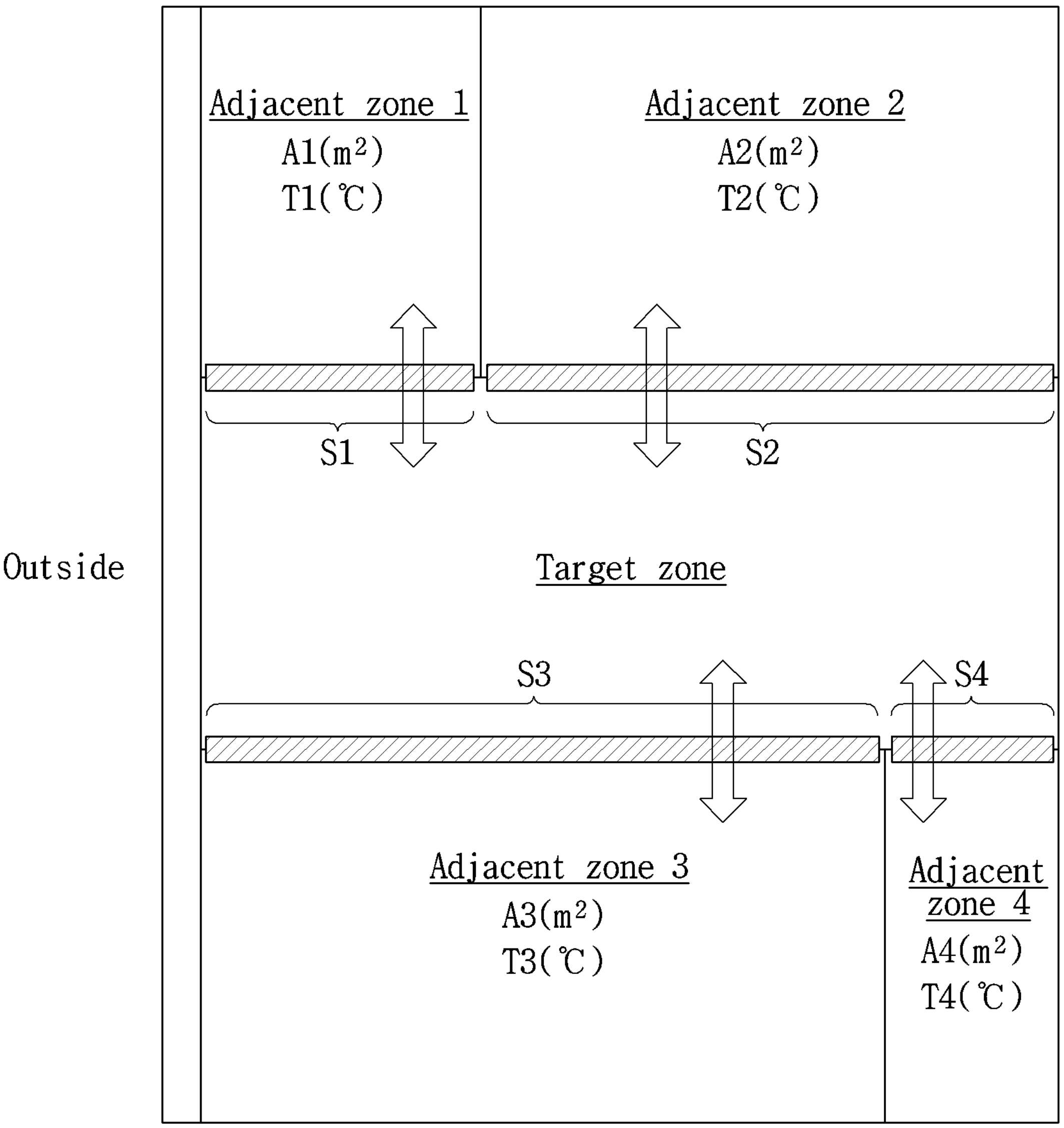
FIG. 7 is a schematic diagram showing processing when a target zone is adjacent to a plurality of adjacent zones in a system according to an embodiment of the present inventive concept.

FIG. 7 is a schematic diagram showing the processing when a target zone is adjacent to a plurality of adjacent zones in a system according to an embodiment of the present inventive concept.

Referring to FIG. 7, the adjacent zones 1 to 4 are adjacent to the target zone, and the ratios of respective adjacent zones may be different from each other as S1, S2, S3, and S4. At this time, when the indoor temperatures of the adjacent zones 1 to 4 are different from each other, a representative value thereof is determined by considering the adjacency ratio to each indoor temperature. Multiple adjacent zones may have slight temperature differences depending on their individual conditions for an easy calculation thereof. In other words, it can be determined as the equation, $T_{TOTAL}=T1\cdot S1+T2\cdot S2+T3\cdot S3+T4\cdot S4$.

When the heating module is operated so that the indoor temperature of the target zone has a preset difference value (e.g., 10° C.) from the indoor temperature of the adjacent zone, the heat energy of the target zone is lost to the outdoor and at the same time, there also occurs the amount of conduction heat loss to the adjacent zone, Accordingly, a calculation is performed using the above equation.

Figure 8:
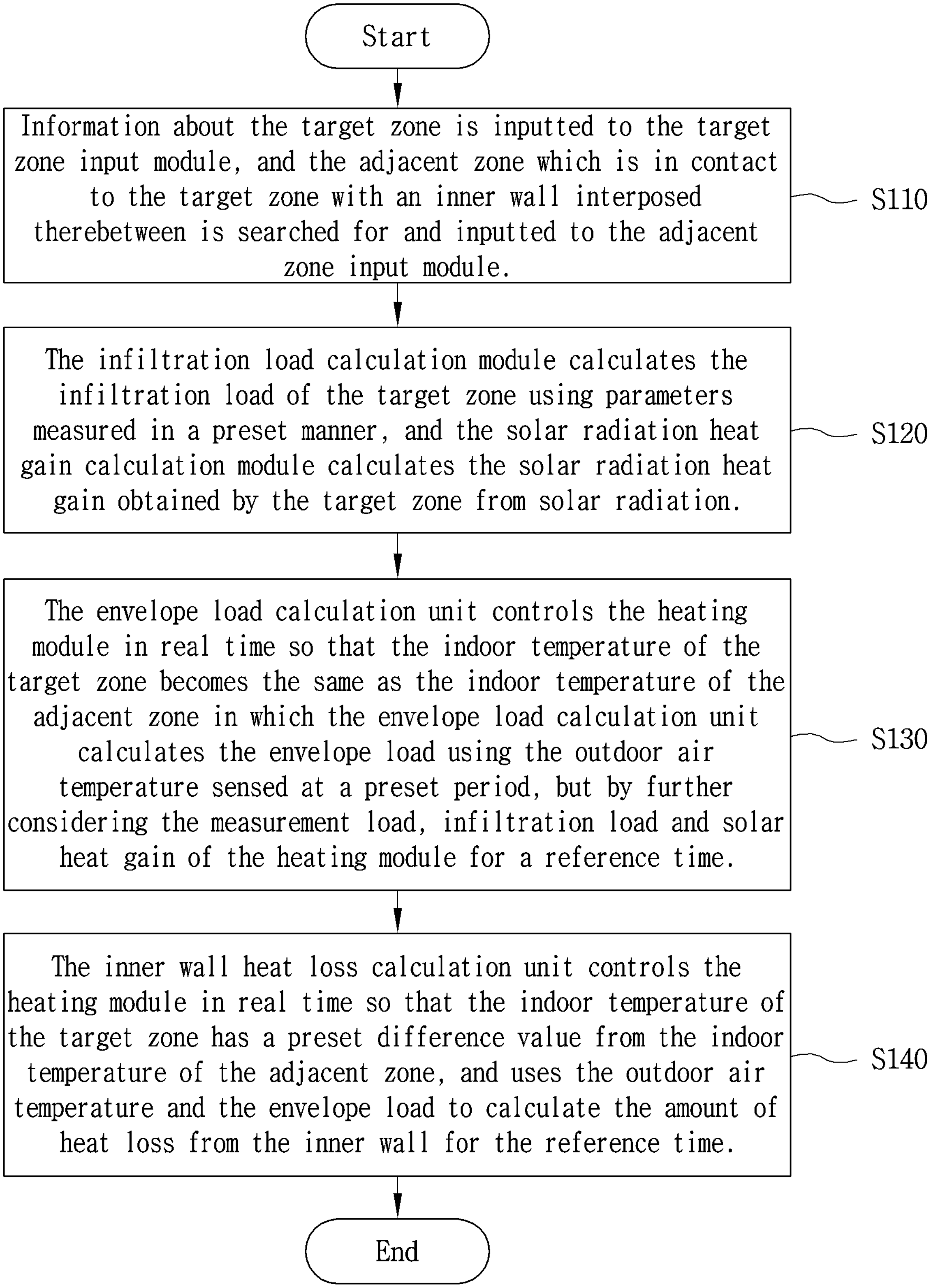
FIG. 8 is a flowchart of a method using a system according to an embodiment of the present inventive concept.

Firstly, a description will be made with reference to FIG. 8. FIG. 8 is a flow chart of a method using a system according to an embodiment of the present inventive concept, and the above-described processing is divided into steps.

In step S110, information about the target zone is inputted to the target zone input module, and the adjacent zone which is in contact to the target zone with an inner wall interposed therebetween is searched for and inputted to the adjacent zone input module.

In step S120, the infiltration load calculation module calculates the infiltration load of the target zone using parameters measured in a preset manner, and the solar radiation heat gain calculation module calculates the solar radiation heat gain obtained by the target zone from solar radiation.

In step S130, the envelope load calculation unit controls the heating module in real time so that the indoor temperature of the target zone becomes the same as the indoor temperature of the adjacent zone in which the envelope load calculation unit calculates the envelope load using the outdoor air temperature sensed at a preset period, but by further considering the measurement load, infiltration load and solar heat gain of the heating module for a reference time.

Here, the envelope load calculation unit is configured to control the heating module so that the indoor temperature and humidity of the adjacent zone that change in real time become the same as the indoor temperature and humidity of the target zone by using a temperature and humidity sensor provided in the adjacent zone. Since the indoor temperature of the adjacent zone is not a temperature that is forcibly maintained, it can be affected by the outdoor air, and the outdoor air temperature is a value that continuously changes on a 24-hour basis. Accordingly, it is desirable to set the heating module to be controlled so that the indoor temperature of the target zone the indoor temperature becomes the same as the temperature of the adjacent zone that changes in real time.

In step S140, the inner wall heat loss calculation unit controls the heating module in real time so that the indoor temperature of the target zone has a preset difference value from the indoor temperature of the adjacent zone, and uses the outdoor air temperature and the envelope load to calculate the amount of heat loss from the inner wall for the reference time.

With reference to FIG. 10 to 13, the steps S110 to S140 will be described based on exemplary test data. Referring first to FIG. 12, The table of FIG. 12 shows exemplary initial conditions of the target zone. All of the initial conditions can be confirmed through field measurements, and if there exists drawing information of the target building, the initial conditions may be obtained from the drawing information.

The initial conditions include the total floor area, outer wall area, window area, envelope area, window area ratio, window insulation performance, SHGC and infiltration rate of the target zone. The envelope area can be understood as the sum of the outer wall and the window.

Figure 10:
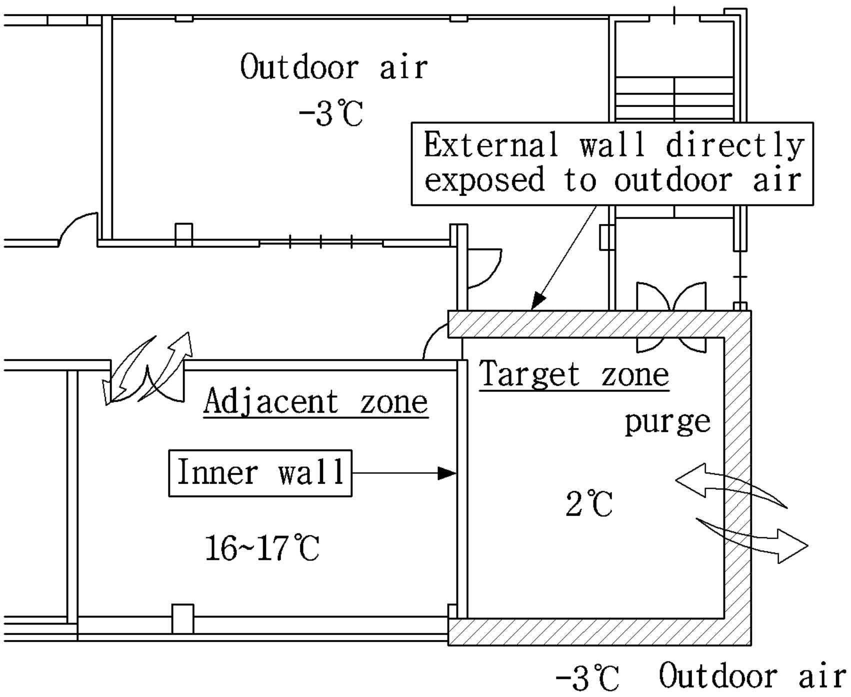
FIG. 10 is a schematic diagram showing an exemplary condition set to explain the step S220 of FIG. 9.

FIG. 10 is a schematic diagram showing exemplary conditions set to explain the above-mentioned purge step. When the outdoor air is −3° C., the target zone is set to 2° C. through the purge step, and the adjacent zone is set to 16~17° C. At this time, as the interior space of the adjacent zone is also opened, the time delay effect of energy absorbed by the wall, floor, furniture and the like therein can be eliminated. When the heating module which is a heat source operates, a time delay effect may occur. However, in view that the object of the present inventive concept is to evaluate and diagnose the thermal performance of the building envelope using a simple method, the time delay effect of the heat source will not be discussed.

Figure 11:
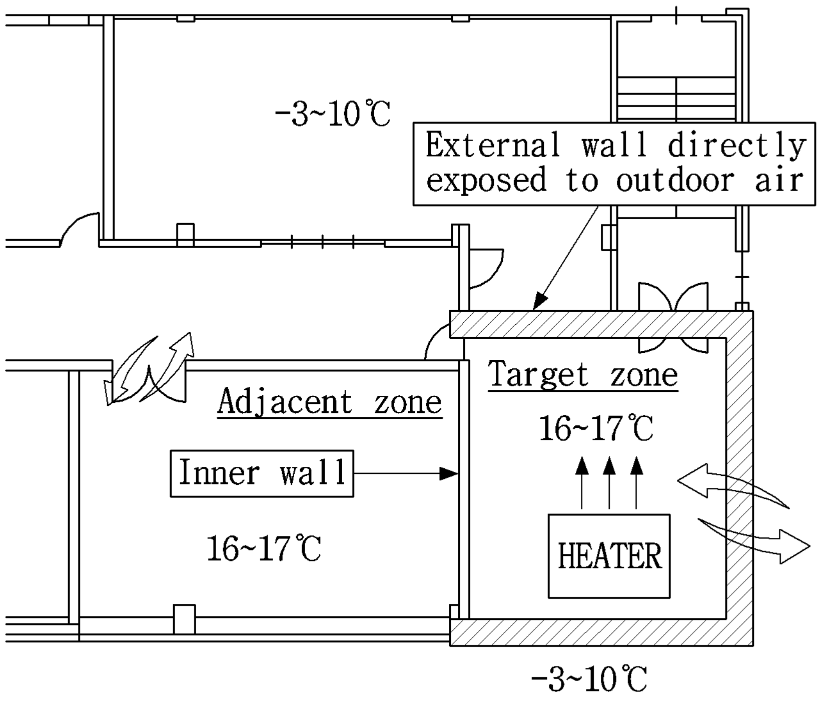
FIG. 11 is a schematic diagram showing a state wherein an exemplary condition is set in step S230 of FIG. 9 to calculate the envelope load using a method of evaluating thermal performance of a building wall according to an embodiment of the present inventive concept.

FIG. 11 is a schematic diagram showing an exemplary conditions set to calculate the envelope load using the thermal performance evaluation method of a building wall according to an embodiment of the present inventive concept. It can be confirmed that the indoor temperatures of the target zone and the adjacent zone become the same by the heating module. In the process, the outdoor air temperature changes from −3 to 10° C.

FIG. 13 is a table showing exemplary test data measured over 48 hours. FIG. 14 shows the inverse matrix of the inner and outer temperature difference matrix ([T]) of the target zone based on the exemplary test data of FIG. 13.

Here, in relation to processing the heat capacity of the wall, if it generally exceeds 24 hours, all heat loss can occur and therefore, the results of measurements for a total of 48 hours reflecting the 24-hour time delay can be used.

The basis of the calculation method applied to one embodiment of the present inventive concept is a method of calculating a load using a thermal balance method, and based on this, there has been devised a method of evaluating the envelope thermal performance using short-term (e.g., 48 hours) measurement data. At this time, in order to minimize variables under these short-term measurement data acquisition conditions, additional conditions for the unused state are necessary. Here, the unused condition may mean a condition in which the ventilation amount of the target zone, heat generation from internal device, lighting and the like, and human body heat are all zero.

As can be seen in FIG. 13, the envelope load can be derived by subtracting the infiltration load from the measurement load plus solar heat gain. In this way, a total of 48 envelope loads can be calculated.

Hereinafter, a method for evaluating thermal performance of building walls according to an embodiment of the present inventive concept will be described with reference to FIG. 9.

Figure 9:
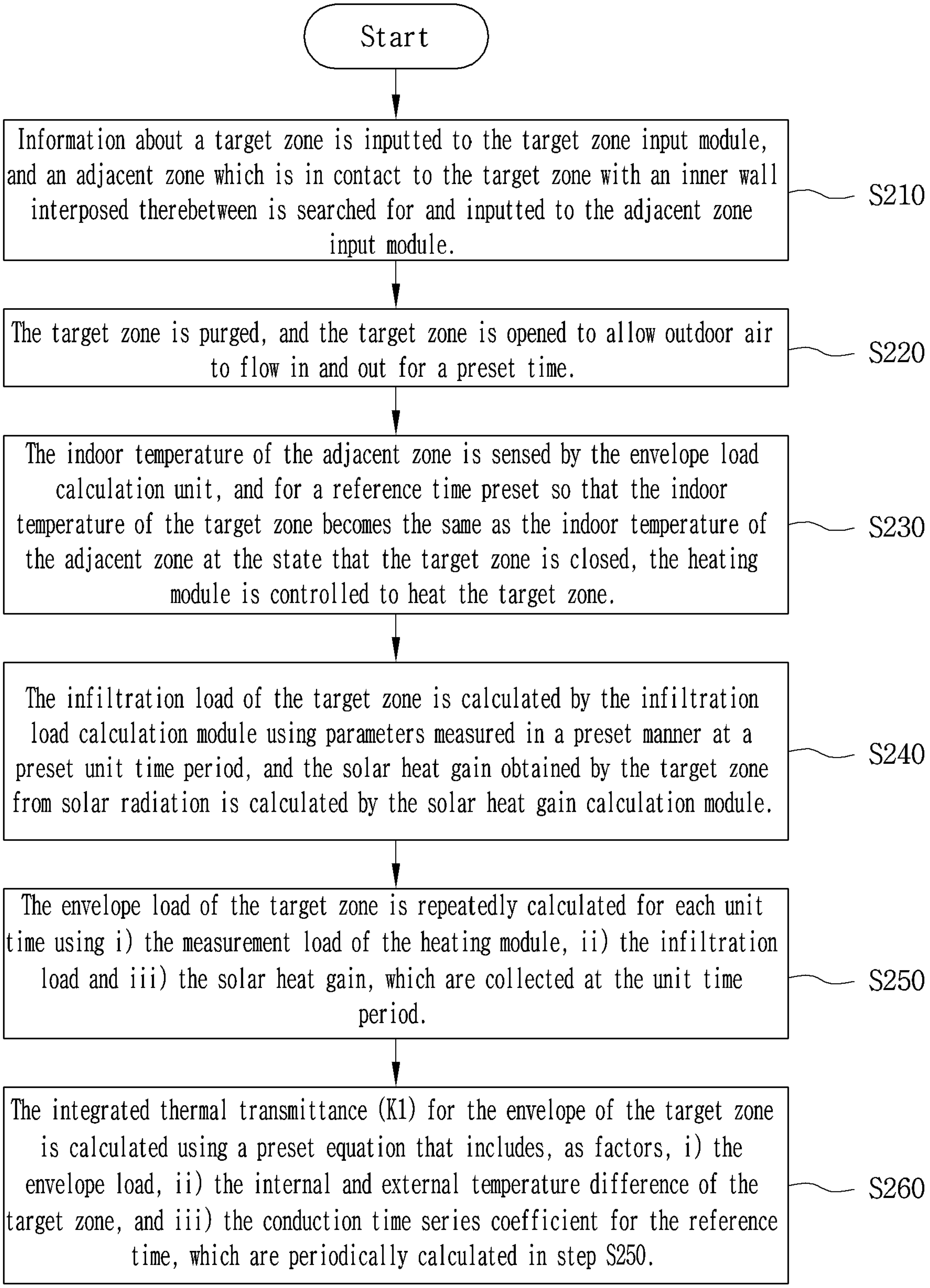
FIG. 9 is a flowchart of a method of evaluating thermal performance of a building wall according to an embodiment of the present inventive concept.

Referring to FIG. 9, a method for evaluating thermal performance of building walls includes steps S210 to S260.

In step S210, information about a target zone is inputted to the target zone input module, and an adjacent zone which is in contact to the target zone with an inner wall interposed therebetween is searched for and inputted to the adjacent zone input module.

To identify the target zone and adjacent zone, the location and shape of the outer wall (or envelope) and inner wall can be determined. Since the target zone is a space selected by the user, when the target zone consists of the first to Nth zones, each of them may be set to independently calculate adjacent zones.

In step S220, the target zone is purged, and the target zone is opened to allow outdoor air to flow in and out for a preset time. The schematic diagram shown in FIG. 10 can be referred to.

In step S230, the indoor temperature of the adjacent zone is sensed by the envelope load calculation unit, and for a reference time preset so that the indoor temperature of the target zone becomes the same as the indoor temperature of the adjacent zone at the state that the target zone is closed, the heating module is controlled to heat the target zone. It can be referred to the schematic diagram shown in FIG. 11 and it can be confirmed that the indoor temperatures of the adjacent zone and the target zone are maintained the same. In this state, the amount of conduction heat loss to the inner wall of the target zone can be removed, and thus the envelope load per unit time can be calculated. Here, the reference time is preferably 48 hours.

In step S240, the infiltration load of the target zone is calculated by the infiltration load calculation module using parameters measured in a preset manner at a preset unit time period, and the solar heat gain obtained by the target zone from solar radiation is calculated by the solar heat gain calculation module. Here, the unit time is preferably 1 hour.

In step S250, the envelope load of the target zone for each unit time is repeatedly calculated using i) the measurement load of the heating module, ii) the infiltration load and iii) the solar heat gain, which are collected at the unit time period.

In step S260, the integrated thermal transmittance (K1) for the envelope of the target zone is calculated using a preset equation that includes, as factors, i) the envelope load, ii) the internal and external temperature difference of the target zone, and iii) the conduction time series coefficient for the reference time, which are periodically calculated in step S250.

Here, Equation 1 below can be used to calculate the integrated thermal transmittance (K1) for the envelope of the target zone.

$$K1 \cdot [D] = \frac{[q_{facade}]}{A} \cdot [T]^{-1} \quad \text{[Equation 1]}$$

Here, [D] is the conduction time series coefficient matrix, [T] is the internal and external temperature difference matrix of the target zone, $[q_{facade}]$ is the envelope load matrix, and A is the envelope area.

The conduction time series coefficient [D] is expressed as a matrix formed to have periodicity within a reference time, and the sum of the components of the matrix can be 1. Referring to Table 1 below, it can be seen that the conduction time element is expressed as a percentage. Table 1 shows that the conduction time series coefficient varies over a 24-hour period depending on the configuration of the curtain wall.

TABLE 1

| | Curtain wall | | | | | |
|---|---|---|---|---|---|---|
| | Spandrel glass, R-1.8 Insulation board, Gypsum board | Spandrel glass, R-3.5 Insulation board, Gypsum board | Metal panel, R-1.8 Insulation board, Gypsum board | Metal panel, R-3.5 Insulation board, Gypsum board | Stone, R-1.8 Insulation board, Gypsum board | Stone, R-3.5 Insulation board, Gypsum board |
| Wall number | 1 | 2 | 3 | 4 | 5 | 6 |
| U, W/(m[1] · K) | 0.428 | 0.244 | 0.429 | 0.244 | 0.427 | 0.244 |
| Total R | 2.34 | 4.10 | 2.33 | 4.09 | 2.34 | 4.10 |
| Hour | Conduction time factor, % | | | | | |
| 0 | 16.4 | 2.5 | 23.0 | 4.1 | 7.5 | 1.0 |
| 1 | 56.7 | 31.6 | 56.3 | 36.5 | 42.8 | 19.1 |
| 2 | 21.3 | 37.1 | 16.5 | 34.9 | 32.2 | 34.6 |
| 3 | 4.5 | 18.1 | 3.3 | 15.6 | 12.3 | 24.5 |
| 4 | 0.9 | 6.9 | 0.7 | 5.8 | 3.8 | 12.2 |
| 5 | 0.2 | 2.5 | 0.1 | 2.0 | 1.1 | 5.2 |
| 6 | 0.0 | 0.9 | 0.0 | 0.7 | 0.3 | 2.1 |
| 7 | 0.0 | 0.3 | 0.0 | 0.2 | 0.1 | 0.8 |
| 8 | 0.0 | 0.1 | 0.0 | 0.1 | 0.0 | 0.3 |
| 9 | 0.0 | 0.0 | 0.0 | 0.0 | 0.0 | 0.1 |
| 10 | 0.0 | 0.0 | 0.0 | 0.0 | 0.0 | 0.0 |
| 11 | 0.0 | 0.0 | 0.0 | 0.0 | 0.0 | 0.0 |
| 12 | 0.0 | 0.0 | 0.0 | 0.0 | 0.0 | 0.0 |
| 13 | 0.0 | 0.0 | 0.0 | 0.0 | 0.0 | 0.0 |
| 14 | 0.0 | 0.0 | 0.0 | 0.0 | 0.0 | 0.0 |
| 15 | 0.0 | 0.0 | 0.0 | 0.0 | 0.0 | 0.0 |
| 16 | 0.0 | 0.0 | 0.0 | 0.0 | 0.0 | 0.0 |
| 17 | 0.0 | 0.0 | 0.0 | 0.0 | 0.0 | 0.0 |

TABLE 1-continued

| | | | | | | |
|---|---|---|---|---|---|---|
| 18 | 0.0 | 0.0 | 0.0 | 0.0 | 0.0 | 0.0 |
| 19 | 0.0 | 0.0 | 0.0 | 0.0 | 0.0 | 0.0 |
| 20 | 0.0 | 0.0 | 0.0 | 0.0 | 0.0 | 0.0 |
| 21 | 0.0 | 0.0 | 0.0 | 0.0 | 0.0 | 0.0 |
| 22 | 0.0 | 0.0 | 0.0 | 0.0 | 0.0 | 0.0 |
| 23 | 0.0 | 0.0 | 0.0 | 0.0 | 0.0 | 0.0 |
| Total Percentage | 100 | 100 | 100 | 100 | 100 | 100 |
| Components from outdoor | F01 | F01 | F01 | F01 | F01 | F01 |
| to indoor | F09 | F09 | F08 | F08 | F10 | F10 |
| (See Table 21) | F04 | F04 | F04 | F04 | F04 | F04 |
| | I02 | I02 | I02 | I02 | I02 | I02 |
| | F04 | I02 | F04 | I02 | F04 | I02 |
| | G01 | F04 | G01 | F04 | I02 | F04 |
| | F02 | G01 | F02 | G01 | F02 | G01 |
| | 0 | F02 | 0 | F02 | 0 | F02 |
| | 0 | 0 | 0 | 0 | 0 | 0 |
| | 0 | 0 | 0 | 0 | 0 | 0 |

| | Stud bag | | | |
|---|---|---|---|---|
| | Metal panel covering material, R-1.9 Glass wool insulation, Gypsum board | Metal panel covering material, R-3.9 Glass wool insulation, Gypsum board | 25 mm Stone, covering material, R-1.9 Glass wool insulation, Gypsum board | 25 mm Stone, R-3.9 Gypsum board covering material, Glass wool insulation, |
| Wall number | 7 | 8 | 9 | 10 |
| U, $W/(m^1 \cdot K)$ | 0.419 | 0.231 | 0.417 | 0.231 |
| Total R | 2.39 | 4.33 | 2.40 | 4.34 |
| Hour | Conduction time factor, % | | | |
| 0 | 26.1 | 16.3 | 9.4 | 5.3 |
| 1 | 56.3 | 57.5 | 44.3 | 39.0 |
| 2 | 14.5 | 20.9 | 29.9 | 34.0 |
| 3 | 2.6 | 4.3 | 11.3 | 14.5 |
| 4 | 0.4 | 0.8 | 3.6 | 5.0 |
| 5 | 0.1 | 0.2 | 1.1 | 1.6 |
| 6 | 0.0 | 0.0 | 0.3 | 0.5 |
| 7 | 0.0 | 0.0 | 0.1 | 0.1 |
| 8 | 0.0 | 0.0 | 0.0 | 0.0 |
| 9 | 0.0 | 0.0 | 0.0 | 0.0 |
| 10 | 0.0 | 0.0 | 0.0 | 0.0 |
| 11 | 0.0 | 0.0 | 0.0 | 0.0 |
| 12 | 0.0 | 0.0 | 0.0 | 0.0 |
| 13 | 0.0 | 0.0 | 0.0 | 0.0 |
| 14 | 0.0 | 0.0 | 0.0 | 0.0 |
| 15 | 0.0 | 0.0 | 0.0 | 0.0 |
| 16 | 0.0 | 0.0 | 0.0 | 0.0 |
| 17 | 0.0 | 0.0 | 0.0 | 0.0 |
| 18 | 0.0 | 0.0 | 0.0 | 0.0 |
| 19 | 0.0 | 0.0 | 0.0 | 0.0 |
| 20 | 0.0 | 0.0 | 0.0 | 0.0 |
| 21 | 0.0 | 0.0 | 0.0 | 0.0 |
| 22 | 0.0 | 0.0 | 0.0 | 0.0 |
| 23 | 0.0 | 0.0 | 0.0 | 0.0 |
| Total Percentage | 100 | 100 | 100 | 100 |
| Components from outdoor | F01 | F01 | F01 | F01 |
| to indoor | F08 | F08 | F10 | F10 |
| (See Table 21) | F03 | G03 | G03 | G03 |
| | I04 | I04 | I04 | I04 |
| | G01 | I04 | G01 | I04 |
| | F02 | G01 | F02 | G01 |
| | 0 | F02 | 0 | F02 |
| | 0 | 0 | 0 | 0 |
| | 0 | 0 | 0 | 0 |
| | 0 | 0 | 0 | 0 |

In other words, the conduction time series coefficient is defined to have a 24-hour periodicity, and the conduction time series coefficient for the 24-hour period can be recalculated as the accurate value by using the integrated heat transmittance (K1). That is, it is possible to easily estimate the approximate value of the integrated heat transmittance (K1) directly related to the envelope performance by using the condition where the matrix component sum of the conduction time series coefficient of [D] is 1.

In addition, the integrated thermal transmittance (K1) calculated in step S260 means a value that takes into account both the thermal transmittance (K11) of the outer wall and the thermal transmittance (K12) of the window. At this time, the thermal transmittance (K11) of the outer wall can be calculated using Equation 2 below.

$$K11 = \frac{K1 - (a_2 \cdot K12)}{a_1} \quad \text{[Equation 2]}$$

Here, a1 and a2 refer to the outer wall area ratio and the window area ratio, respectively, based on the total envelope area. Through this, it is possible to calculate both the thermal transmittance of the outer wall (K11) and the thermal transmittance of the window (K12), thereby providing the user with the exact cause of the thermal performance degradation in the present. Here, a1 and a2 refer to the area ratio, and thus the sum of a1 and a2 is constant as 1.

FIG. 15 is a matrix showing [$q_{facade}$]/A based on the exemplary test data of FIG. 13, and FIG. 16 is a matrix showing K1·[D] based on the exemplary test data of FIG. 13. Through this series of calculations, the integrated thermal transmittance (K1) of the envelope of the target zone can be calculated.

Once the integrated thermal transmissivity (K1) for the envelope of the target zone is calculated, it can be used to calculate the envelope load in the process of calculating the amount of the inner wall heat loss. This is explained with reference to FIGS. 17 to 19.

Figure 17:
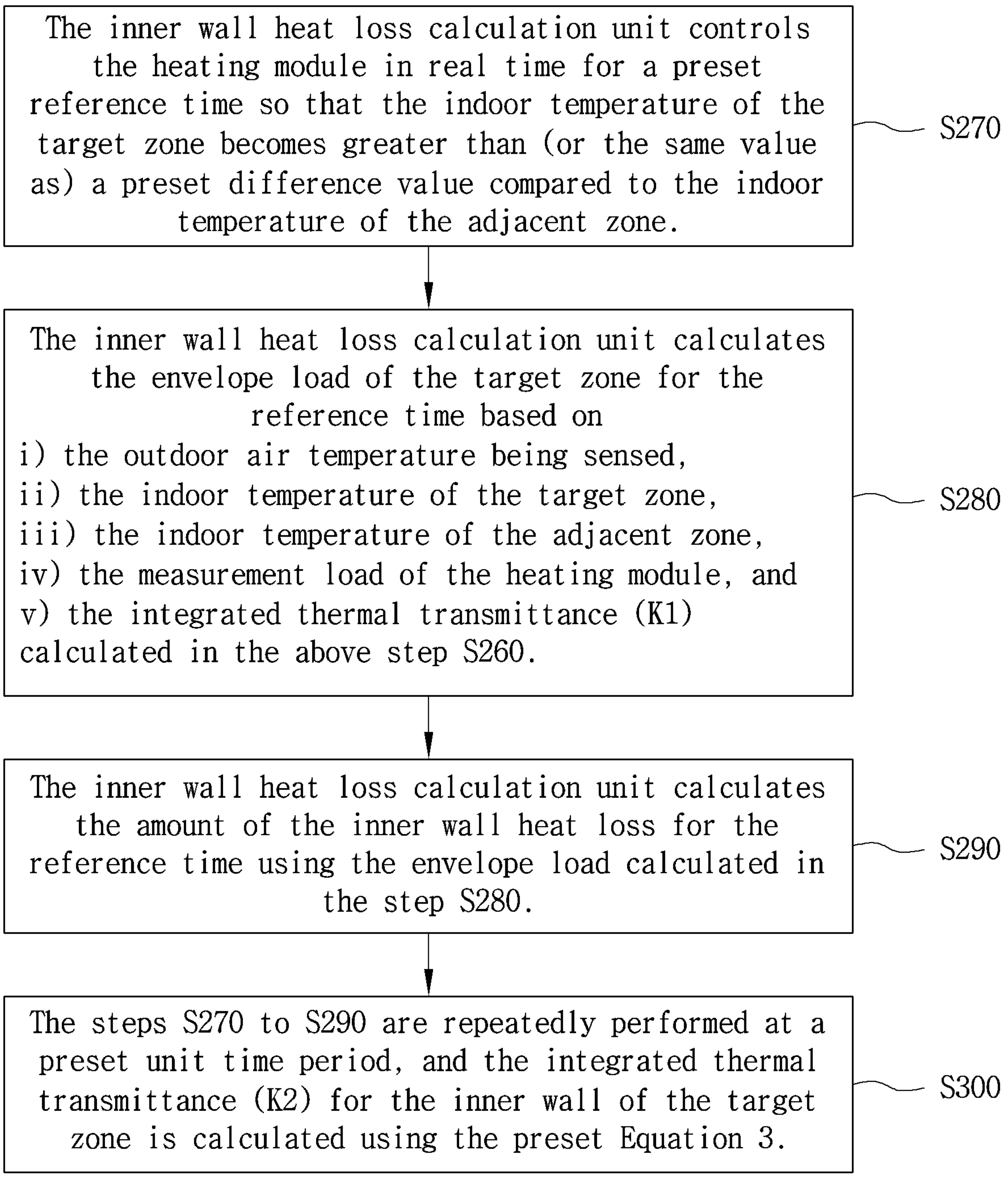
FIG. 17 is a flowchart showing the process of calculating the amount of heat loss from the inner wall using a method of evaluating thermal performance of a building wall according to an embodiment of the present inventive concept.
Figure 18:
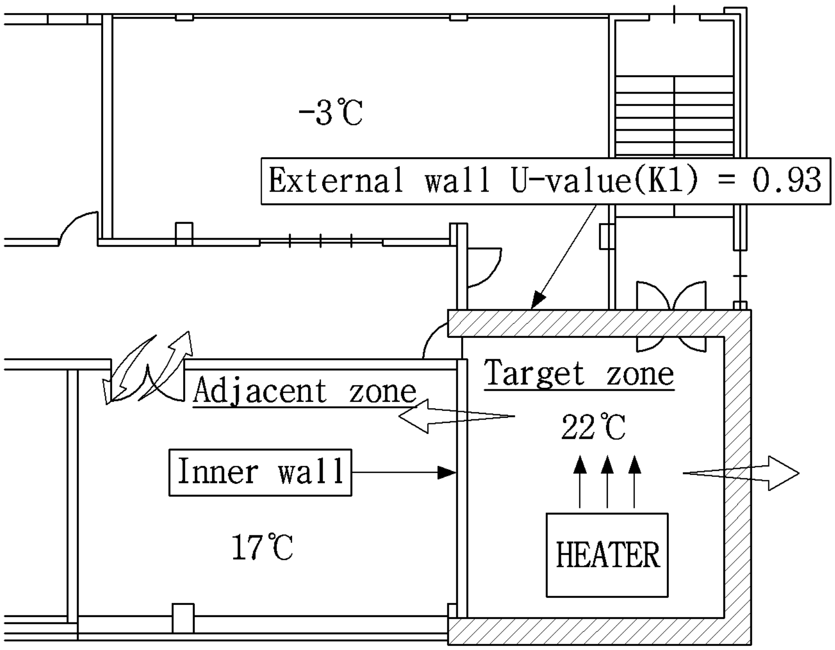
FIG. 18 is a schematic diagram showing an exemplary condition set in step S270 to calculate the amount of heat loss of the inner wall using a method of evaluating thermal performance of a building wall according to an embodiment of the present inventive concept.

FIG. 17 is a flowchart showing the process of calculating the amount of inner wall heat loss using a method of evaluating thermal performance of building walls according to an embodiment of the present inventive concept, and FIG. 18 is a schematic diagram showing a state that an exemplary condition is set in step S270 to calculate the amount of heat loss from the inner wall using the method of evaluating thermal performance of building walls according to an embodiment of the present inventive concept.

FIG. 19 is a table showing the results of calculating the amount of the inner wall heat loss with the indoor temperature of the target zone maintained at 22° C. for example, based on the exemplary test data of FIG. 13.

Referring to FIG. 17, the process of calculating the amount of inner wall heat loss includes steps S270 to S300.

In step S270, the inner wall heat loss calculation unit controls the heating module in real time for a preset reference time so that the indoor temperature of the target zone becomes greater than (or the same value as) a preset difference value (e.g., 10° C.) compared to the indoor temperature of the adjacent zone.

In step S280, the inner wall heat loss calculation unit calculates the envelope load of the target zone for the reference time based on i) the outdoor air temperature being sensed, ii) the indoor temperature of the target zone, iii) the indoor temperature of the adjacent zone, iv) the measurement load of the heating module, and v) the integrated thermal transmittance (K1) calculated in the above step S260.

Here, the envelope load ($q_{facade}$) can be calculated using the integrated thermal transmittance (K1), envelope area (A), outdoor air temperature ($T_o$), and indoor temperature (Ti) of the target zone. In other words, it can be derived as $q_{facade}=K1 \cdot A \cdot (Ti-T_o)$. FIG. 19 shows the calculation result assuming that the integrated heat transmittance (K1) is 0.93 $W/m^2K$.

In step S290, the inner wall heat loss calculation unit calculates the amount of the inner wall heat loss for the reference time using the envelope load calculated in the step S280.

That is, the value calculated in step S280 is used, and the amount of the inner wall heat loss can be derived by subtracting the envelope load and immersion load from the measurement load plus solar heat gain.

In step S300, the integrated thermal transmittance (K2) for the inner wall of the target zone using Equation 3 below can be calculated.

$$K2 \cdot [D] = \frac{[q_{in}]}{A} \cdot [T]^{-1} \quad \text{[Equation 3]}$$

Here, [D] is the conduction time series coefficient matrix, [T] is the inner and outer temperature difference matrix of the target zone, [$q_{in}$] is the inner wall heat loss matrix, and A is the inner wall zone in contact with the adjacent zone.

By repeatedly performing the above-described steps S270 to S290 at a preset unit time (e.g., 1 hour) period, a table similar to FIG. 13 can be created. However, unlike FIG. 13, it means the envelope load in a state where the indoor temperature of the target zone is forcibly set to a preset difference value (e.g., 10° C.) from the indoor temperature of the adjacent zone.

The data collected in this way can be used to calculate K2 using the Equation 3, but in the same manner as described above.

The above-described description of the present disclosure is for illustrative purpose, and a person skilled in the art to which the present disclosure pertains will understand that the present inventive concept can be easily modified into other specific forms without changing its technical idea or essential features. Therefore, the embodiments described above should be understood in all respects as illustrative and not restrictive in all respects. For example, each component described in a single form may be implemented in a distributed form, and similarly, components described in the distributed form may also be implemented in a combined form.

The scope of the present disclosure is indicated by the claims described below rather than the detailed description above, and all changes or modifications derived from the meaning and scope of the claims and their equivalent concepts should be construed as being included in the scope of the present disclosure.

The invention claimed is:

1. A system for diagnosing a building envelope thermal performance, comprising:

a target zone input module for searching for a target zone including at least one outer wall in contact with the outdoor air from among spaces included and partitioned in a building and inputting information about the target zone;

an adjacent zone input module for searching for an adjacent zone in contact with the target zone with an inner wall interposed therebetween and inputting information about the adjacent zone;

a heating module, physically provided in the target zone, the heating module comprising a heater and a fan configured to forcibly circulate heated air by convection so as to adjust the internal temperature of the target zone in a preset manner;

a heat loss calculation module for calculating the amount of heat loss of the target zone in a preset manner based on a measurement load consumed by the heating module;

a solar heat gain calculation module for calculating solar heat gain obtained by the target zone from solar radiation; and an infiltration load calculation module for calculating an infiltration load of the target zone using parameters measured in a preset manner, wherein the heat loss calculation module (i) controls the heating module in real time, after a purge step in which the target zone is opened to outdoor air, so that the indoor temperature of the target zone is equalized with the indoor temperature of the adjacent zone and calculates an envelope load using the thermal balance between the target zone and the adjacent zone together with an outdoor air temperature sensed at a preset period, the measurement load, the infiltration load, and the solar heat gain over a reference time of at least 48 hours; and (ii) controls the heating module in real time so that the indoor temperature of the target zone is maintained at a preset difference value from the indoor temperature of the adjacent zone and thereby calculates an amount of heat loss from the inner wall based on the previously calculated envelope load, wherein the system further derives an integrated thermal transmittance (K1) of the envelope and an integrated thermal transmittance (K2) of the inner wall using matrix equations that incorporate a conduction time-series coefficient matrix [D], an internal-and-external temperature-difference matrix [T], and the respective load matrices over the reference time.

2. The system according to claim 1, wherein the heat loss calculation module includes an envelope load calculation unit for calculating an envelope load that is heat-lost to the outdoor through the outer wall of the target zone; and an inner wall heat loss calculation unit for calculating an inner wall heat loss that is heat-lost to the adjacent zone through the inner wall of the target zone, wherein the envelope load calculation unit controls the heating module in real time so that the indoor temperature of the target zone becomes the same as the indoor temperature of the adjacent zone, and calculates the envelope load using an outdoor air temperature sensed at a preset period.

3. The system according to claim 2, wherein the inner wall heat loss calculation unit controls the heating module in real time so that the indoor temperature of the target zone has a preset difference value from the indoor temperature of the adjacent zone, and calculates the inner wall heat loss using the outdoor air temperature and the envelope load.

4. The system according to claim 2, wherein the heating module is configured to adjust the indoor temperature of the target zone in real time so that the changing indoor temperature of the adjacent zone becomes the same as the indoor temperature of the target zone.

5. The system according to claim 2, wherein when the target zone is arranged to be adjacent to a plurality of adjacent zones, the envelope load calculation unit calculates the adjacent ratio of each of the target zone and the adjacent zone and determines a representative indoor temperature of the adjacent zone under the consideration of the adjacent ratio to the indoor temperature of each adjacent zone.

6. The system according to claim 1, wherein the heating module includes:

a main heating module provided in the target zone; and a sub-heating module provided in the adjacent zone, wherein when the target zone is arranged to be adjacent to a plurality of adjacent zones, the sub-heating module provided in each of the plurality of adjacent zones is controlled to artificially adjust the indoor temperatures in all of the plurality of adjacent zones to be the same.

7. A method of diagnosing a building envelope thermal performance using the system according to claim 1, comprising:

a step (a1) in which information about the target zone is inputted to the target zone input module, and the adjacent zone which is in contact to the target zone with an inner wall interposed therebetween is searched for and inputted to the adjacent zone input module;

a step (a2) in which the infiltration load calculation module calculates the infiltration load of the target zone using parameters measured in a preset manner, and the solar radiation heat gain calculation module calculates the solar radiation heat gain obtained by the target zone from solar radiation;

a step (a3) in which, after a purge step in which the target zone is opened to outdoor air, the envelope load calculation unit controls the heating module in real time so that the indoor temperature of the target zone becomes the same as the indoor temperature of the adjacent zone, the envelope load calculation unit calculates the envelope load using the outdoor air temperature sensed at a preset period, but by further considering the measurement load, infiltration load and solar heat gain of the heating module for a reference time of least 48 hours; and a step (a4) in which the inner wall heat loss calculation unit controls the heating module in real time so that the indoor temperature of the target zone has a preset difference value from the indoor temperature of the adjacent zone, and uses the outdoor air temperature and the envelope load to calculate the amount of heat loss from the inner wall for the reference time, and uses the outdoor air temperature and the envelope load to calculate the amount of heat loss from the inner wall for the reference time, wherein the method further comprises deriving integrated thermal transmittances (K1) and (K2) using the matrix equations recited in claim 1.

8. The method according to claim 7, wherein in the step (a3), the envelope load calculation unit controls the heating module so that the indoor temperature and humidity of the adjacent zone that change in real time become the same as the indoor temperature and humidity of the target zone by using a temperature and humidity sensor provided in the adjacent zone.

* * * * *